US011947687B2

(12) United States Patent
Fritz et al.

(10) Patent No.: US 11,947,687 B2
(45) Date of Patent: Apr. 2, 2024

(54) TRUSTED SYSTEM UPGRADE AND SECRETS TRANSFER IN A SECURE COMPUTING ENVIRONMENT

(71) Applicant: INTERNATIONAL BUSINESS MACHINES CORPORATION, Armonk, NY (US)

(72) Inventors: Florian Fritz, Filderstadt (DE); Timo Kussmaul, Boeblingen (DE); Dennis Zeisberg, Bielefeld (DE); Angel Nunez Mencias, Stuttgart (DE); Dimitrij Pankratz, Boeblingen (DE); Stefan Liesche, Boeblingen (DE); Sebastian Hense, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 17/449,036

(22) Filed: Sep. 27, 2021

(65) Prior Publication Data
US 2023/0095755 A1  Mar. 30, 2023

(51) Int. Cl.
*G06F 21/60* (2013.01)
*G06F 8/65* (2018.01)
(Continued)

(52) U.S. Cl.
CPC .............. *G06F 21/606* (2013.01); *G06F 8/65* (2013.01); *G06F 21/44* (2013.01); *H04L 9/088* (2013.01)

(58) Field of Classification Search
CPC .......... G06F 21/606; G06F 8/65; G06F 21/44; H04L 9/088
See application file for complete search history.

(56) References Cited

U.S. PATENT DOCUMENTS 7,793,106 B2 *  9/2010  Bugbee ................ H04L 9/3268
                                                 713/168
8,713,322 B2 *  4/2014  Pravetz ................. G06F 21/64
                                                 713/176
(Continued)

FOREIGN PATENT DOCUMENTS

CN      104272699 A      1/2015
TW      202101266 A      1/2021

OTHER PUBLICATIONS

Disclosed Anonymously, "Protecting Secrets in Docker Environments," IP.com, Jul. 20, 2020, 6 pages, IP.com No. IPCOM000262988D, Retrieved from the Internet: <URL: https://priorart.ip.com/IPCOM/000262988>.
(Continued)

*Primary Examiner* — Hosuk Song
(74) *Attorney, Agent, or Firm* — Scott S. Dobson (57) ABSTRACT

A computer-implemented method for securely transferring a secret from a source computing component to a target computing component, wherein the source computing component and the target computing component are part of a secure computing environment is disclosed. The method comprises upon the source computing component receiving from the target computing component a signed attestation document, verifying, by the source computing component, an authenticity and content of the attestation document, and upon a successful verification of the authenticity and the content, transferring, by the source computing component the secret to the target computing system. Thereby, the attestation document is attesting that the target computing component is compliant to an update governance rule.

20 Claims, 6 Drawing Sheets

100

102  upon the source computing component receiving from the target computing component a signed attestation document, the source computing component verifies an authenticity and content of the attestation document 104  upon a successful verification of the authenticity and the content, the source computing component transfers the secret – e.g., an encryption/decryption key or another secret code to the target computing system (51) Int. Cl.
    *G06F 21/44*     (2013.01)
    *H04L 9/08*     (2006.01)

(56) References Cited

U.S. PATENT DOCUMENTS

| | | | |
|---|---|---|---|
| 11,240,244 B2* | 2/2022 | Murdoch | H04L 9/50 |
| 11,263,294 B2* | 3/2022 | Bertani | G06Q 20/36 |
| 11,281,887 B2* | 3/2022 | Bartlett | G06V 30/36 |
| 11,290,276 B2* | 3/2022 | Perlman | H04L 63/123 |
| 11,363,009 B2* | 6/2022 | Guccione | H04L 9/0894 |
| 2016/0048696 A1* | 2/2016 | Follis | G06F 21/645 |
| | | | 726/28 |
| 2017/0244787 A1 | 8/2017 | Rangasamy | |
| 2020/0021491 A1 | 1/2020 | McCormick | |
| 2020/0021615 A1 | 1/2020 | Wainner | |
| 2021/0117246 A1 | 4/2021 | Lal et al. | |
| 2021/0266304 A1 | 8/2021 | Zee et al. | |

OTHER PUBLICATIONS

Fritz, Pending U.S. Appl. No. 17/472,972, filed Sep. 13, 2021, entitled: "Trust Validation for Software Artifacts", pp. 1-39.

\* cited by examiner

100

102 upon the source computing component receiving from the target computing component a signed attestation document, the source computing component verifies an authenticity and content of the attestation document

104 upon a successful verification of the authenticity and the content, the source computing component transfers the secret – e.g., an encryption/decryption key or another secret code to the target computing system

TRUSTED SYSTEM UPGRADE AND SECRETS TRANSFER IN A SECURE COMPUTING ENVIRONMENT

BACKGROUND

Field of the Invention

The invention relates generally to a computer-implemented method for securely transferring a secret between computing components, and more specifically, to a computer-implemented method for securely transferring a secret from a source computing component to a target computing component, wherein the source computing component and the target computing component are part of a secure computing environment. The invention relates further to an upgrade system for securely transferring a secret key from a source computing component to a target computing component, and a computer program product.

Related Art

In view of a massively increase in hacker attacks on computing systems of all kinds and in every enterprise, secure computing environments are becoming an important tool for insuring process support for companies and data protection. This relates to any kind of computing, be it on mainframe computers, open source operating systems supported systems, personal devices, mobile devices, as well as, IoT (Internet of Things) infrastructures. In this context, trusted execution environments play a leading role in order to ensure a proper functioning of application programs or services as building blocks of application programs. Today, secure execution environments may have two main tasks: (i) protect memory access outside of application workloads and (ii) protect application code from manipulation (in some cases, also protecting related data).

Some of the known problems and challenges of prior art trusted execution environments and secure execution technologies show weaknesses in the following situation: secure life migration, in particular, during update of an application and respective workloads. This update aspect is especially important if the outdated application or service is using encryption/decryption keys for data access.

Additionally, moving trust control from an infrastructure provider and workload provider to a data controller and/or owner can also be problematic. Furthermore, the movement of control of trust from an infrastructure provider and workload provider to a data controller and/or owner may also be problematic. In case of container computing environments, it is often unclear which of the software containers can be trusted. Furthermore, in classical trusted execution environments, confidential computing protected workloads cannot be managed and orchestrated by a given infrastructure without compromising levels of trust and data confidentiality. Furthermore, existing trusted execution environments may also be—in some cases—vulnerable to system updates including malicious or vulnerable software versions not being compliant with update and/or upgrade policies. Furthermore, infrastructure providers may access data by manipulating software infrastructure systems. However, also this aspect may have to be addressed by advanced trusted execution environments.

In this context, some documents have already been published: E.g., document US 2020/0 021 615 A1 describes a container development system to perform authorization of each unique container instance by the enterprise organization that published the container image and requested the container instance. A controller may be programmed or configured to apply one or more authorization policies to determine if a container instance should be executed or not. Additionally, document US 2017/0 244 787 A1 describes techniques for hot swapping and hot scaling containers between cloud services. The method includes storing, with a cloud exchange, data indicating an association of a first container of a first private network with a second container of a second private network which are coupled to the cloud exchange to send and receive data packets via the cloud exchange.

However, none of these documents address the problem described above, in particular, the update scenario of a secure access to data is part of a container instance. Thus, there may be a need to address such a scenario in a safe and trustworthy manner.

SUMMARY OF THE INVENTION

According to one aspect of the present invention, a computer-implemented method for securely transferring a secret from a source computing component to a target computing component, wherein the source computing component and the target computing component are part of a secure computing environment may be provided. The method may comprise upon the source computing component receiving from the target computing component a signed attestation document, the source computing component may verify an authenticity and content of the attestation document, and upon a successful verification of the authenticity and the content, the source computing component may transfer the secret to the target computing system. Thereby, the attestation document may be attesting that the target computing component is compliant to an update governance rule.

According to another aspect of the present invention, an upgrade system for securely transferring a secret key from a source computing component to a target computing component may be provided. The system comprises a processor and a memory, communicatively coupled to the processor, wherein the memory stores program code portions that, when executed, enable the processor, to: upon the source computing component, controlled by the processor, receiving from the target computing component a signed attestation document, the source computing component, controlled by the processor, may verify an authenticity and content of the attestation document, and upon a successful verification of the authenticity and the content, the source computing component, controlled by the processor, may transfer the secret to the target computing system. Thereby, the attestation document may be attesting that the target computing component is compliant to an update governance rule.

The proposed computer-implemented method for securely transferring a secret from a source computing component to a target computing component, wherein the source computing component and the target computing component are part of a secure computing environment may offer multiple advantages, technical effects, contributions and/or improvements:

One of the problems solved—in contrast to known technologies—may be in the fact that a secure life migration, in particular during update of application and respective workloads is becoming reality. This is of special interest in case access to data may be made using an encryption key/a secret for the workload data. The concept proposed here may ensure a secure transfer of the encryption/decryption key or any other secret—to the new workload after the migration or update.

This may also allow a safeguarded movement of trust from an infrastructure provider—e.g., a cloud computing provider—and a workload provider—e.g., a provider of a specific service—to the owner of the data, i.e., the data controller. Thereby, it may be ensured that workloads dynamically determined which other containers can be trusted. A startup of a workload—e.g., in the form of a container instance—may only be possible after a successful trust validation. Hence, confidential computing protected workloads may be managed and orchestrated by infrastructure without compromising levels of trust and data confidentiality. Thus, the solution proposed here may support trusted ecosystems for "scale-out", as well as trusted ripple update scenarios. Furthermore, specific kinds of security attacks may be avoided: e.g., system updates attempts by malicious or old or vulnerable software versions. This kind of attack may be addressed by the concept proposed here by verifying update policies. Moreover, negative effects caused by infrastructure providers may be avoided, wherein it is tried to manipulate the underlying infrastructure software systems.

The here proposed update governance rules may define requirements and policies for updating the application—e.g., in form of a container instance—which may be executed in a trusted execution environment. These update governance rules may be enforced whenever an existing application is to be updated. If the update governance rules cannot be fulfilled, the new component—i.e., the new application, e.g., in form of a container instance—will not be updated. However, if the update governance rules can be fulfilled, the novel application/component will be deployed in a new version and may perform an advantageous "secure handover" between the old and the new version of the application.

Thereby, the update governance component may be implemented as part of the application workload itself and executed in the same trusted execution scope to prevent any external manipulation. Hence, a plurality of requirements and policies—which are generally freely definable—may be verified.

This can also protect investments and reduce risks of supply chain attacks in scenarios in which the workload provider himself may be attacked or the workload provider is the attacker, as newer versions of a computing component may be blocked by an update governance rule unless the data owner inspected and verified its safety.

In the following, additional embodiments of the inventive concept—applicable for the method as well as for the system—will be described.

According to an advantageous embodiment of the method, the update governance rule may describe that the target computing component is part of a secure execution environment, that the target computing component is compliant to at least one predefined characteristic—in particular, a set of characteristics—and/or that the target computing component may be generated by a secure computing environment. It may be understood, that these mentioned update governance rules may represent only a subset of the potential update governance rules which may span a much broader set of conditions. Some more of such conditions are discussed below in the context of FIG. 4.

According to another advantageous embodiment of the method, the predefined characteristic may define (i) a set of earlier source computing components from which an upgrade to the target computing component is possible and/or (ii) a set of build process characteristics to which the target computing component should be compliant with. This way, only predefined upgrade paths may be allowed, whereas other (and allowed) update paths are not supported by the proposed method. Furthermore, a controlled set of conditions under which the target computing component—to mention it again—an application or a software container instance or a virtual machine—may have been built. Thereby, it may also be ensured that the build process may have also been executed in a trusted computing environment.

According to a preferred embodiment of the method, the target computing component may be an updated version of the source computing component. Hence, the target computing component may be younger than the source computing component. The target computing component may include some bug fixes or additional functions.

According to an interesting embodiment of the method, the target computing component and the source computing component may each be an executable software container or a virtual machine. The executable software container may be a component in a Docker computing environment. Thereby, a container may be a standard unit of software that packages up code in all its dependency so the application may run quickly and reliable from one computing environment to another. The Docker container image is thereby a lightweight, stand-alone, executable package of software that includes everything needed to run an application: application logic code, runtime, system tools, system libraries and settings.

According to a useful embodiment of the method, the target computing component and the source computing component may each comprise an update governance component for ensuring compliance to the update governance rule. In the figures below, the update governance component is shown as policy API on the source computing component and target computing component side. These may be responsible for the establishing of trust (in a computational sense) and transferring the secret from the source computing component to the target computing component.

According to another preferred embodiment, the method may also comprise: upon a successful verification and the transferring the secret to the target computing component, taking over operation by the target computing component, and shutting down the source computing component. At this point in time, the source computing component is history and all operations are performed by the target computing component. The source computing component data may also have been transferred to the target computing component storage and—optionally—the source computing component may have been disconnected from its storage.

According to another pretty useful embodiment, the method may further comprise: upon an initialization of a first computing component—or any other initialized computing component—a new encryption key—or, in general, a new secret—may be created by the first computing component, and a new data store related to the first computing component may be generated. This way, a standard procedure for initializing new computing components, i.e., each computing component, may be guaranteed.

According a to further developed embodiment of the method, an update governance component for ensuring compliance to the update governance rule may be located—and in particular, executed—in a third system. This may be implemented outside of the source computing component and the target computing component. Optionally, the update governance component may also be executed in its own secure computing environment which may be compliant to its own secure execution rules and regulations.

According to another advanced embodiment of the method, the update governance rule—or the plurality of update governance rule—may describe a list of one or more entities that authorize an update through a secure mechanism. This way, it may be possible to control that a verification quorum may be needed in order to initiate and execute the update process from the source computing component to the target computing component. E.g., a qualified number of operators may be needed to confirm an upgrade from the source computing component to the target computing component. This may be based on technical mechanisms using software signatures.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject—matter, also any combination between features relating to different subject—matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, to which the invention is not limited.

Preferred embodiments of the invention will be described, by way of example only, and with reference to the following drawings.

DETAILED DESCRIPTION

In the context of this description, the following conventions, terms and/or expressions may be used:

The term 'securely transferring a secret' may denote that a secret—in particular, an access code or an encryption/decryption key—may be sent from a source to a target system without a possibility of compromising the transfer. This may be enabled by trusted components, like a trusted sender, a trusted receiver, a trusted transmission path and/or a trusted computing environment.

The term 'source computing component' may denote an application of a certain version. The application may also be implemented as part of a virtual machine or a Docker container instance.

The term 'target computing component' may denote another, a similar or the same application if compared to the source computing component; however, the target computing component may have a higher version number or release, i.e., it may be newer. As a consequence, the target computing component may also be a software application, a virtual machine or a Docker container.

The term 'secure computing environment' may denote computing components interacting with one another in an uncompromising way. This may also apply to data being stored in a secure storage system as well as other data security measures. The data may be encrypted with a secure key and a computing component may only be activated using a secure key or signature.

The term 'signed attestation document' may denote basically a binary string in which the attestation may be codified. Furthermore, the string may be signed, meaning encapsulated and a software envelope, such that the origin of the document/the binary string can be proven.

The term 'update governance rule' may denote one or more conditions which have to be fulfilled in order to allow or enable a version upgrade of an application, a virtual machine or a software container instance.

The term 'updated version' may denote a newer embodiment of an existing software artifact such as an application, a virtual machine or a Docker container instance.

The term 'executable software container' may denote a directly executable software artifact, e.g., in the form of a Docker container instance. Docker is thereby the known set of platform as a service (PaaS) products that use operating system virtualization to deliver software in packages called containers. Containers are isolated from each another and bundle their own software, libraries and configuration files; they can communicate with each other through well-defined channels.

Figure 1:
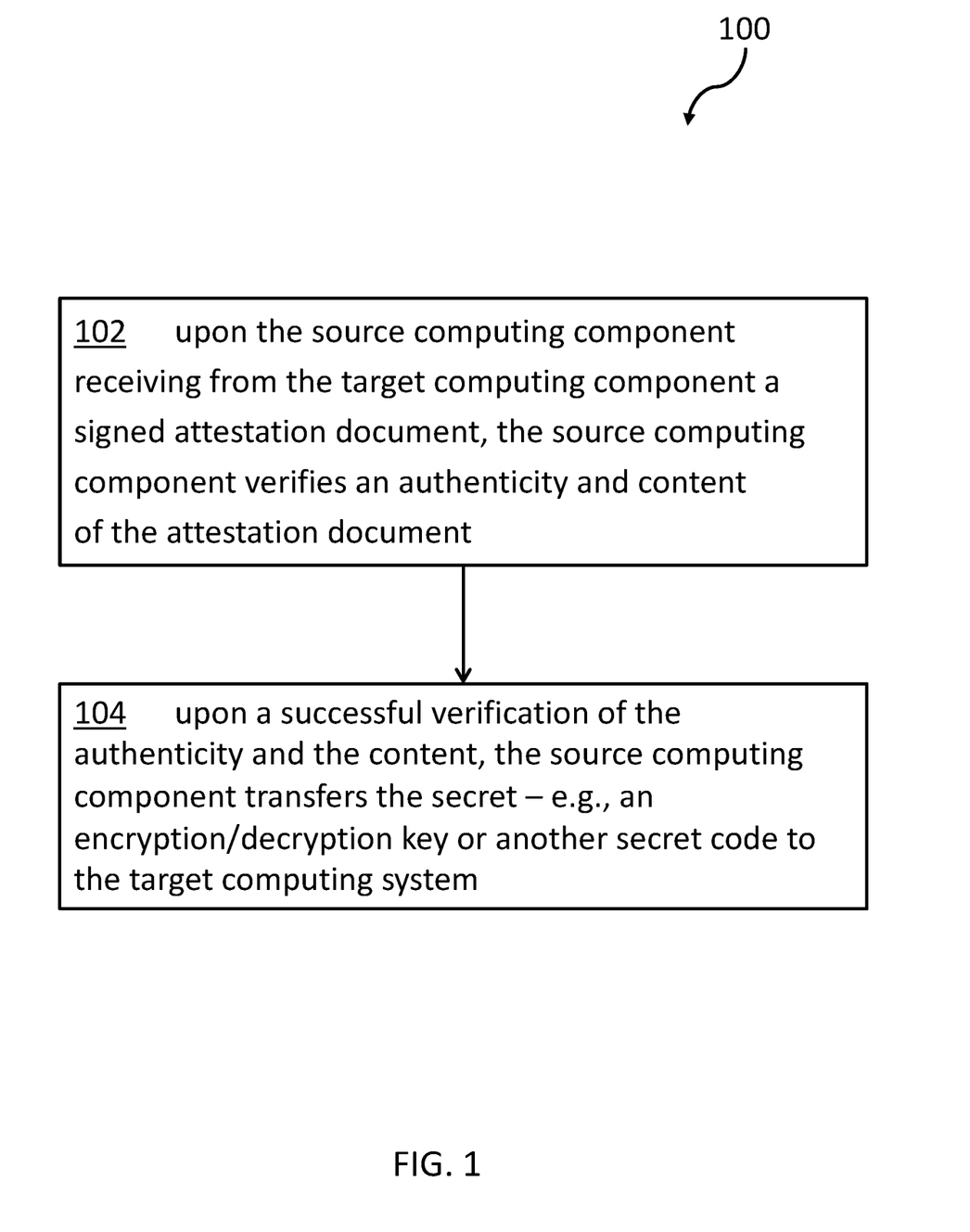
FIG. 1 shows a block diagram of an embodiment of the inventive computer-implemented method for securely transferring a secret from a source computing component to a target computing component, wherein the source computing component and the target computing component are part of a secure computing environment.

In the following, a detailed description of the figures will be given. All instructions in the figures are schematic. Firstly, a block diagram of an embodiment of the inventive computer-implemented method for securely transferring a secret from a source computing component to a target computing component, wherein the source computing component and the target computing component are part of a secure computing environment is given. Afterwards, further embodiments, as well as embodiments of the upgrade system for securely transferring a secret from a source computing component to a target computing component will be described.

FIG. 1 shows a block diagram of a preferred embodiment of the computer-implemented method 100 for securely transferring a secret from a source computing component—e.g., an older container or application version—to a target computing component, e.g., another container or new updated application—wherein the source computing component and the target computing component are part of a secure computing environment. The method comprises: upon the source computing component receiving from the target computing component a signed attestation document, the source computing component verifies, 102, an authenticity and content of the attestation document, and upon a successful verification of the authenticity and the content, the source computing component transfers, 104, the secret—e.g., an encryption/decryption key or another secret code to the target computing system. Thereby, the attestation document is attesting that the target computing component is compliant to an update governance rule, in particular, a plurality of rules, i.e. update governance rules.

Figure 2:
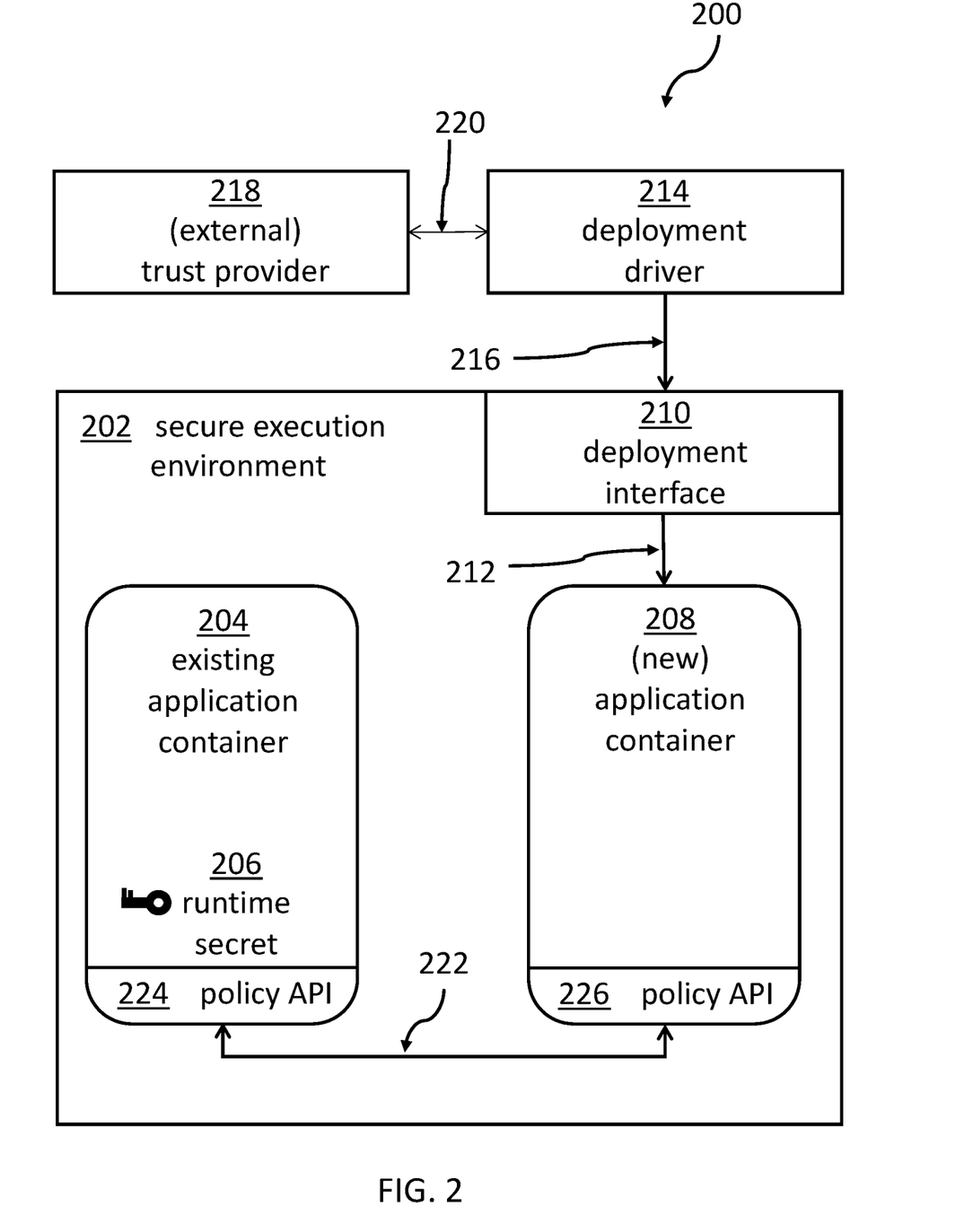
FIG. 2 shows a block diagram of an exemplary configuration illustrating dependencies and connections between components to support the novel concept.

FIG. 2 shows a block diagram of an exemplary configuration 200 illustrating dependencies and connections between components to support the novel concept. In case a deployment of a new application container 208 is requested, the deployment driver 214 will start the deployment process. The deployment driver 214 triggers, 216, a deployment of the application by providing information like an application version to run and/or an application configuration. For this, an external trust provider can exist and provide, 220, required tokens or signatures from the trust provider 218 to the deployment driver 214.

The existing application container 204 which general function shall be migrated to a new/updated application container 208 can maintain a runtime secret 206, e.g., in order to access the existing application container 200 for data (not shown). The deployment interface 210 can create, 212, the new application container 208 and may also be instrumental in generating a new protected, i.e., encrypted data store. Hence, the deployment interface 210 can also be instrumental in generating a new runtime secret (not shown). However, in any case, the existing application container 204 as well as the new application container 208 can have as an integral part an update governance component included (in FIG. 1 denoted as policy API 224, 226) that negotiates trust and may also optionally hand over required secret keys. It should also be noted that the existing application container 204 will perform its operation until a takeover is triggered via the policy APIs 224 and 226. Because the security relevant elements—i.e., the deployment interface 210 the existing application/application container 204, the new application container 208, as well as the policy APIs 224, 226—are all executed in the same secure execution environment 202. The probability for disturbing or manipulating or attack the migration process from the existing application container 204 to the new application container 208 can be reduced to the value close to Zero. I.e., because everything potentially vulnerable can be executed in the same secure execution environment 202, the handover of secret runtime keys shall no longer be a problem. However, it is not a requirement that the source computing component (e.g., the source computing component 204) and the target computing component (e.g., the new application container 208) are executed in the same secure execution environment 202.

Figure 3:
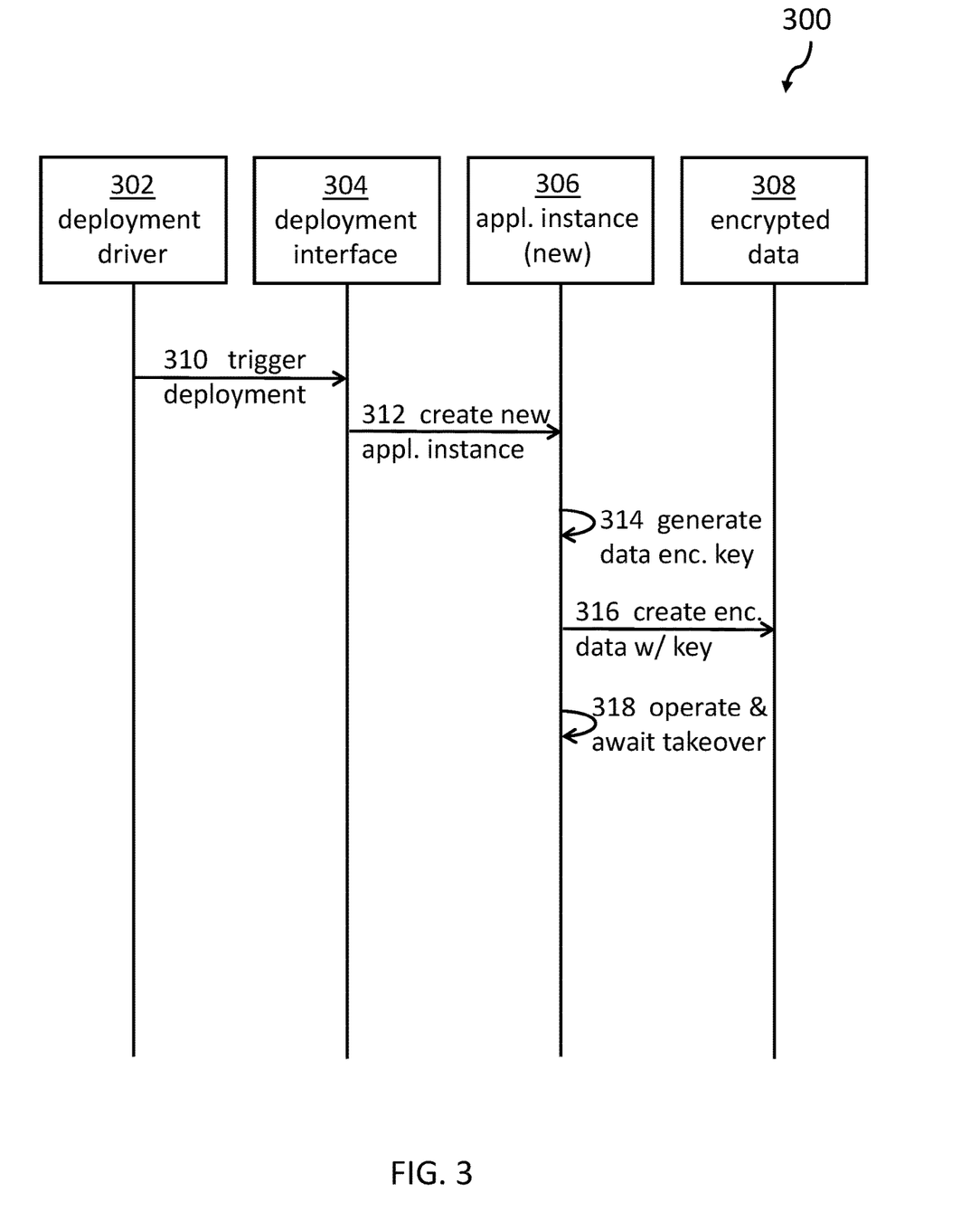
FIG. 3 shows a communication diagram for the steps for an initial startup of, e.g., a container instance.

FIG. 3 shows a communication diagram 300 for the steps for initializing a software artifact using the here proposed concept. The active components are shown in the upper region of the figure: the deployment driver 302 (compare deployment driver 214, FIG. 2), the deployment interface 304 (compare deployment interface 210, FIG. 2), the application instance 306 (compare new application container 208, FIG. 2) and the encrypted data 308.

The following steps would be executed:
1. In case a deployment is requested, the deployment driver 302 will start the initializing process.
2. The deployment driver 302 will trigger, 310, an initialization of the application by providing information like: bearer token, current application instance application version to run, application configuration, etc.
3. The new application instance 306 will start up (initiated by the deployment interface 304 and symbolized by reference numeral 312)
4. The new application 306 generates a secret(s) according to function.
5. The new application instance 306 does now start its operation.

The new application (or application container or container instance) will, in particular, generate, 314, also a new data encryption key and create, 316, encrypted data with the newly generated encryption key. It will then be operational and await complete takeover, 318.

Figure 4:
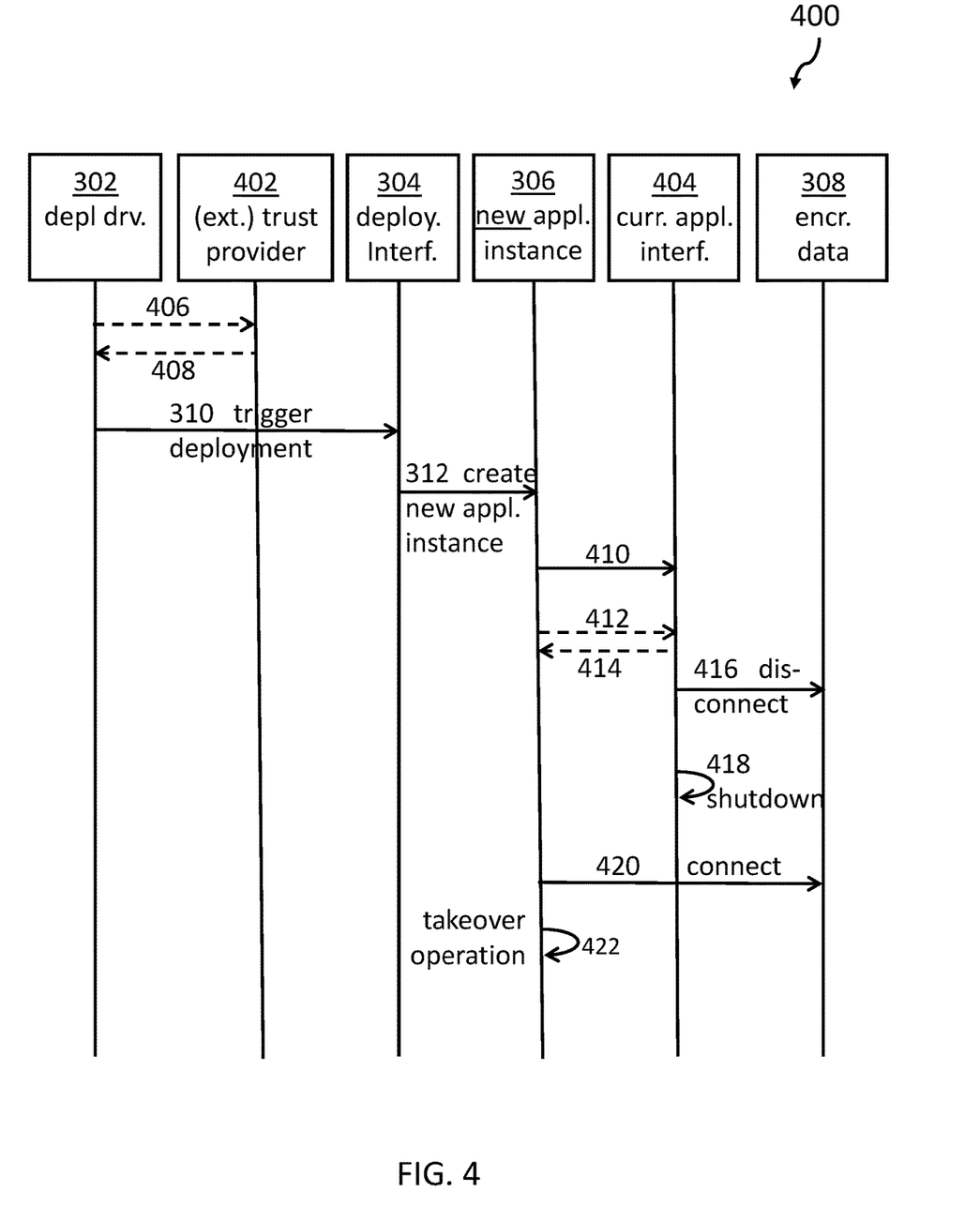
FIG. 4 shows another, more extended communication diagram of the process already sketched out in short in the context of FIG. 3.

FIG. 4 shows a communication diagram 400 of the update process. In addition to the active elements, described in the context of FIG. 3, the new elements are the (external) trusted provider 402 and the current application interface 404 (i.e., policy API of the current application).

The optional deployment authorization request 406 can optionally be on-site by returning, 408, a token from the trust provider 402 to the deployment driver 302. Furthermore, in FIG. 4, the takeover request 410 is sent from the new application instance 306 (via its API) to the current application interface 404. The new application instance 306 needs to provide, 412, evidence in respect to the takeover policy (update governance policy, see above) and the data encryption key must be passed, 14 from the current application via the current application interface 404 (i.e., policy API) to the new application instance 306 (via its policy API).

Additionally, FIG. 4 shows the disconnect 416 from the current application interface 404 to the encrypted data 308, its shutdown, 418, and the subsequent connection 420 from the new application instance 306 to the encrypted data 308. Finally, reference numeral 422 shows the takeover operation of the new application instance 306.

As already mentioned, a large variety of different policies can be implemented via the policy API of the applications, i.e., the update governance component. Some examples are listed below:

The update of a sensitive example application requires sign off by a 2 out of 3 quorum of signers. The reason for this may be: The update may introduce a change in behavior of the application that needs to be reviewed and signed off. For this, e.g., the application of the following update governance rules are defined:
  Set of entitled "update approvers" and their signature keys.
  Possession of a bearer token from a central authority requires the quorum for update approval: 2 out of 3
Additional can also be requirements:
  An update requires a set of certificates (certified assertions) on the new application version.
  An update requires certain versions of prerequisite components (e.g., other applications the example application interacts with). This may require potentially a transitive updates.
  An update can also require a certain state of the execution environment. Also this needs to be asserted.

The update governance rules can, e.g., be stored securely in a repository of the secure computing environment.

In any case, the update governance policies or rules—i.e., the trust negation can be implemented (i) as part of the application (e.g., in secure code), (ii) created during a build process (e.g., based on a policy captured during build), and/or (iii) created by an entitled user (during deployments or during runtime).

Further examples of update policies, update governance rules or policies in general being instrumental for the newly proposed concept:

Authentication through SSO (single sign-on) provider (e.g., oauth, saml, jwt): This policy can validate whether an authorization from an external trust provider exists. With this policy it is possible to only perform application updates when they were authorized by the required stakeholders or automated systems.

Version compatibility:

This policy can ensure compatibility for application updates. E.g., each application policy comprises the application version, and the list of previous application versions that can be updated.

Policies:

This can ensure that build steps for the new application instance have been successfully executed. It can also ensure that all build artifacts, as required by the application policies, are present for the new instance.

Operator (signature) quorum for update:

This policy can verify whether a quorum of signatures or authorizations was provided by stakeholders. So, e.g., at least 2 administrators may have to sign off the rollout.

Only update to newer version: This policy can ensure that handovers are not done with older versions. The actual allowed age or version can be defined by the application policies.

Policy that verifies "external" requirements for update:

The policy can allow update only if, e.g., keys in an external keystore are rotated, data is backed up, ACL lists are audited, automated (scripted) tasks are successfully executed, and so on.

Policy may reference and invoke interfaces of external components to verify the requirements.

Policies on (runtime) environment?

This policy can validate whether the execution environment of the new application instance fulfills certain rules. This could include secure enclaves, operating in certain availability zones, data centers or regions.

Figure 5:
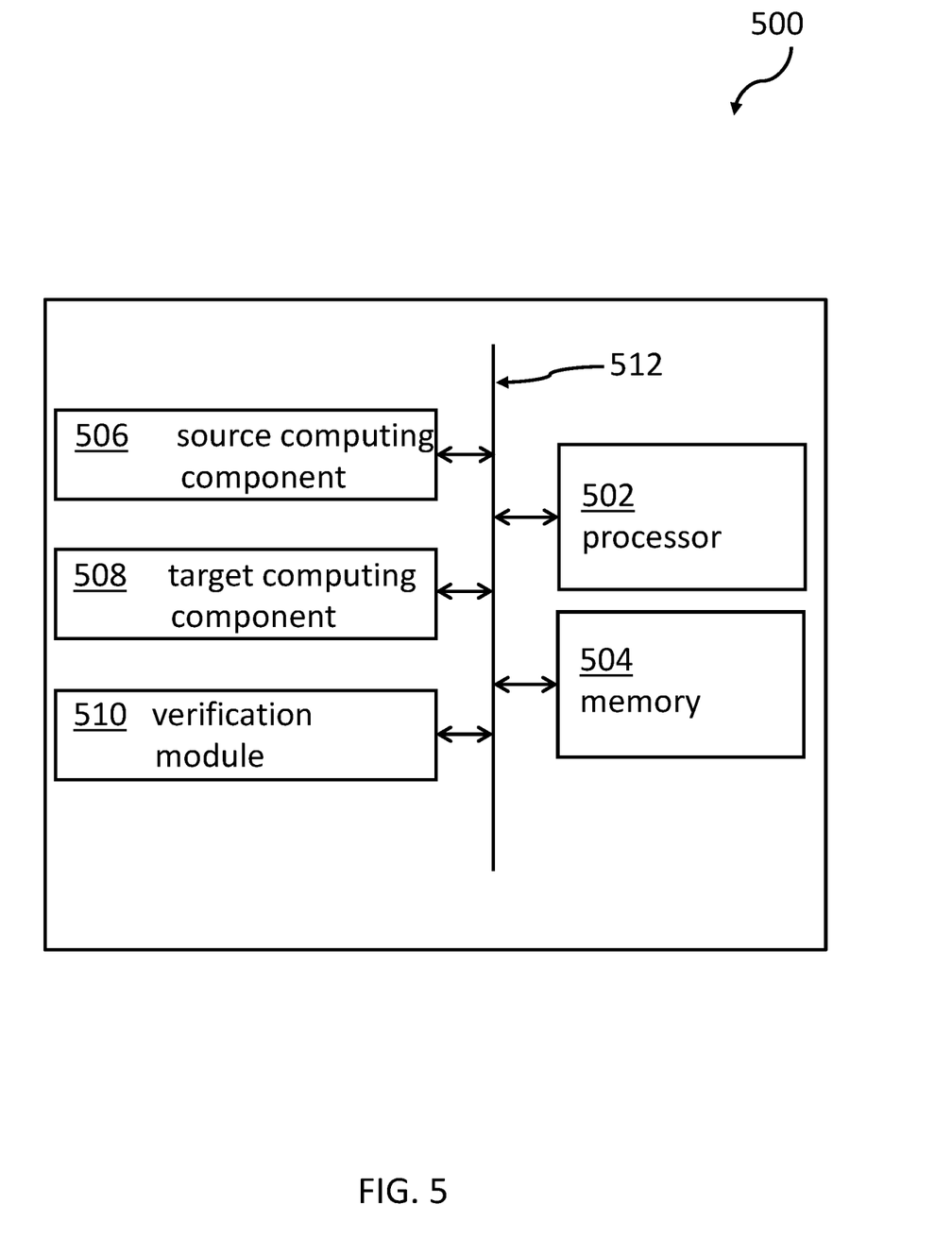
FIG. 5 shows a block diagram of an embodiment of the upgrade system for securely transferring a secret key from a source computing component to a target computing component.

FIG. 5 shows a block diagram of an embodiment of the upgrade system 500 for securely transferring a secret from a source computing component 506 to a target computing component 508. The system comprises a processor 502 and a memory 504, communicatively coupled to the processor 502, wherein the memory 504 stores program code portions that, when executed, enable the processor 502, to receive—in particular, by the source computing component 506—from the target computing component 508 a signed attestation document, and upon the reception verify—in particular, by a verification module 510 which can also be the policy API—an authenticity and content of the attestation document.

Furthermore, the processor 602 may be enabled, upon a successful verification of the authenticity and the content, transferring the secret to the target computing system 508 by the source computing component 506, controlled by the processor. Thereby, the attestation document can be attesting that the target computing component is compliant to an update governance rule.

It is shall also be mentioned that all functional units, modules and functional blocks—in particular, the processor 502, the memory 504, the source computing component 506, the target computing component 508, the verification module 510—may be communicatively coupled to one another for signal or message exchange in a selected 1:1 manner. Alternatively the functional units, modules and functional blocks can be linked to a system internal bus system 512 for a selective signal or message exchange.

Figure 6:
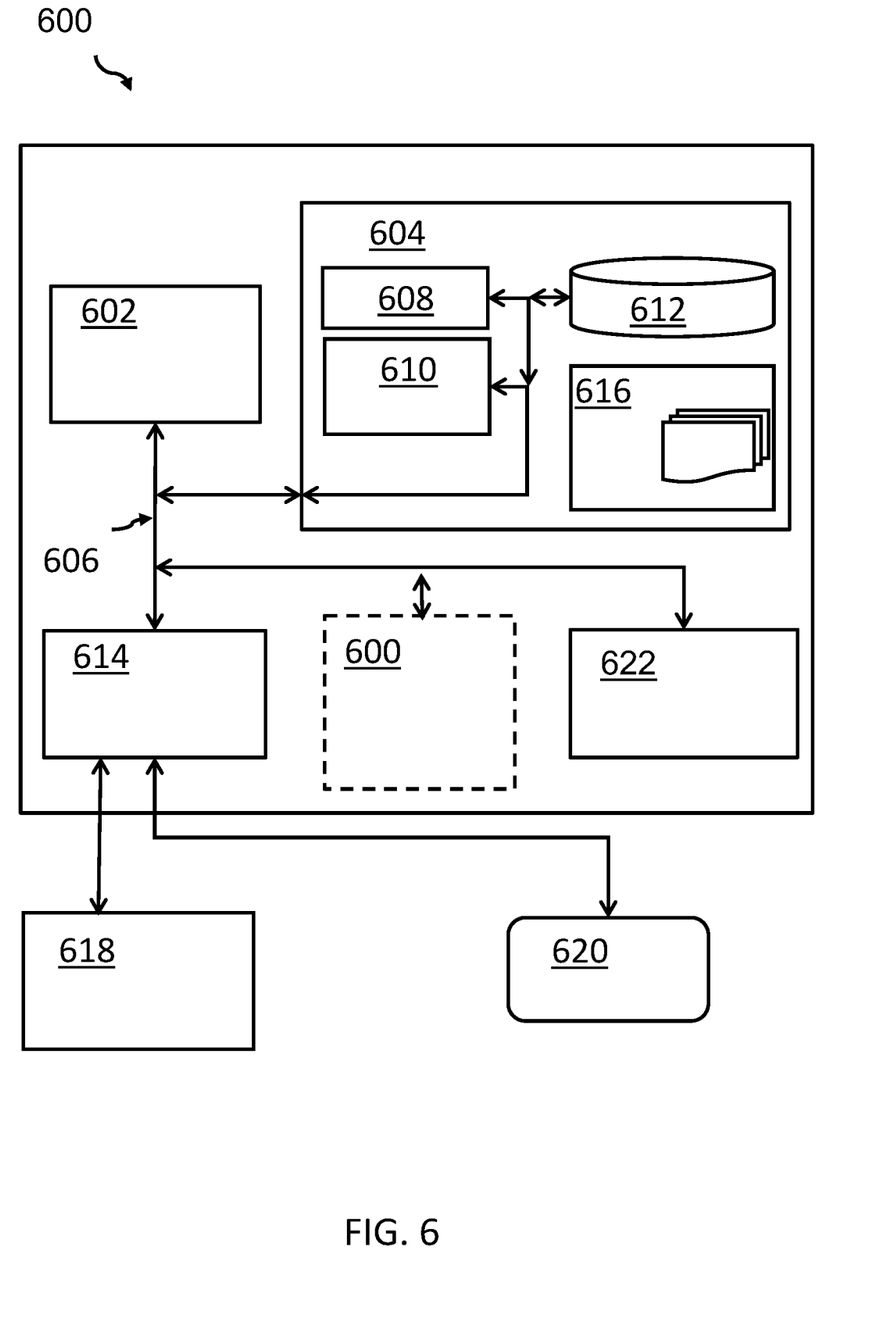
FIG. 6 shows an embodiment of a computing system comprising the system according to FIG. 5.

Embodiments of the invention may be implemented together with virtually any type of computer, regardless of the platform being suitable for storing and/or executing program code. FIG. 6 shows, as an example, a computing system 600 suitable for executing program code related to the proposed method.

The computing system 600 is only one example of a suitable computer system, and is not intended to suggest any limitation as to the scope of use or functionality of embodiments of the invention described herein, regardless, whether the computer system 600 is capable of being implemented and/or performing any of the functionality set forth hereinabove. In the computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 600 is shown in the form of a general-purpose computing device. The components of computer system/server 600 may include, but are not limited to, one or more processors or processing units 602, a system memory 604, and a bus 606 that couple various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random access memory (RAM) 608 and/or cache memory 610. Computer system/server 600 may further include other removable/non-removable, volatile/non-volatile computer system storage media. By way of example only, a storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g., at least one) of program modules that are configured to carry out the functions of embodiments of the invention.

The program/utility, having a set (at least one) of program modules 616, may be stored in memory 604 by way of example, and not limiting, as well as an operating system, one or more application programs, other program modules, and program data. Each of the operating systems, one or more application programs, other program modules, and program data or some combination thereof, may include an implementation of a networking environment. Program modules 616 generally carry out the functions and/or methodologies of embodiments of the invention, as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of the computer system/server 600 via bus 606. It should be understood that, although not shown, other hardware and/or software components could be used in conjunction with computer system/server 600. Examples, include, but are not limited to: microcode, device drivers, redundant processing units, external disk drive arrays, RAID systems, tape drives, and data archival storage systems, etc.

Additionally, the upgrade system 500 for securely transferring a secret from a source computing component to a target computing component may be attached to the bus system 606.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the C programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms a, an and the are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

Some embodiments of the inventive concepts of the present disclosure may be described by the flowing clauses:

1. A computer-implemented method for securely transferring a secret from a source computing component to a target computing component, wherein the source computing component and the target computing component are part of a secure computing environment, the method comprising
   upon the source computing component receiving from the target computing component a signed attestation document,
      the source computing component verifies an authenticity and content of the attestation document, and
      upon a successful verification of the authenticity and the content,
         the source computing component transfers the secret to the target computing system,
   wherein the attestation document is attesting that the target computing component is compliant to an update governance rule.
2. The method according to clause 1, wherein the update governance rule describes
   that the target computing component is part of a secure execution environment,
   that the target computing component is compliant to at least one predefined characteristic, and/or
   that the target computing component is generated by the a secure computing environment.
3. The method according to clause 1 or 2, wherein the predefined characteristic defines
   a set of earlier source computing components from which an upgrade to the target computing component is possible, a set of build process characteristics to which the target computing component is compliant with.

4. The method according to any of the preceding clauses, wherein the target computing component is an updated version of the source computing component.

5. The method according to any of the preceding clauses, wherein the target computing component and the source computing component is each an executable software container or a virtual machine.

6. The method according to any of the preceding clauses, wherein the target computing component and the source computing component comprises each an update governance component for ensuring compliance to the update governance rule.

7. The method according to any of the preceding clauses, also comprising
upon a successful verification and the transferring the secret to the target computing component,
taking over operation by the target computing component, and
shutting down the source computing component.

8. The method according to any of the preceding clauses, also comprising
upon an initialization of a first computing component,
create a new encryption key by the first computing component, and
generating a new data store related to the first computing component.

9. The method according to any of the preceding clauses, wherein an update governance component for ensuring compliance to the update governance rule is located in a third system 10. The method according to any of the preceding clauses, wherein the update governance rule describe a list of one or more entities that authorize an update through a secure mechanism.

11. An upgrade system for securely transferring a secret key from a source computing component to a target computing component, wherein the source computing component and the target computing component are part of a secure computing environment, the upgrade system comprising
a processor and a memory, communicatively coupled to the processor, wherein the memory stores program code portions that, when executed, enable the processor, to
upon the source computing component, controlled by the processor, receiving from the target computing component a signed attestation document,
the source computing component, controlled by the processor, verifies an authenticity and content of the attestation document,
upon a successful verification of the authenticity and the content,
the source computing component, controlled by the processor,
transfers the secret to the target computing system,
wherein the attestation document is attesting that the target computing component is compliant to an update governance rule.

12. The upgrade system according to clause 11, wherein the update governance rule describes
that the target computing component is part of a secure execution environment,
that the target computing component is compliant to at least one predefined characteristic,
and/or
that the target computing component is generated by the a secure computing environment.

13. The upgrade system according to clause 11 or 12, wherein the predefined characteristic defines
a set of earlier source computing components from which an upgrade to the target computing component is possible,
a set of build process characteristics to which the target computing component is compliant with.

14. The upgrade system according to any of the clauses 11 to 13, wherein the target computing component is an updated version of the source computing component.

15. The upgrade system according to any of the clauses 11 to 14, wherein the target computing component and the source computing component is each an executable software container or a virtual machine.

16. The upgrade system according to any of the clauses 11 to 15, wherein the target computing component and the source computing component comprises each an update governance component for ensuring compliance to the update governance rule.

17. The upgrade system according to any of the clauses 11 to 16, wherein the processor is also enabled to
upon a successful verification and the transferring the secret to the target computing component,
taking over operation by the target computing environment controlled by the processor, and
shutting down the source computing component, controlled by the processor.

18. The upgrade system according to any of the clauses 11 to 17, also comprising
upon an initialization of a first computing component,
create a new encryption key by the first computing component, and
generating a new data store related to the first computing component.

19. The upgrade system according to any of the clauses 11 to 18, wherein the update governance rule describe a list of one or more entities that authorize an update through a secure mechanism.

20. A computer program product for securely transferring a secret key from a source computing component to a target computing component, wherein the source computing component and the target computing component are part of a secure computing environment, the computer program product comprising a computer readable storage medium having program instructions embodied therewith, the program instructions being executable by one or more computing systems or controllers to cause the one or more computing systems to
upon the source computing component, controlled by the processor, receiving from the target computing component a signed attestation document,
the source computing component, controlled by the processor, verifies an authenticity and content of the attestation document,
upon a successful verification of the authenticity and the content,
the source computing component, controlled by the processor,
transfers the secret to the target computing system,
wherein the attestation document is attesting that the target computing component is compliant to an update governance rule.

What is claimed is:

1. A computer-implemented method for securely transferring a secret from a source computing component to a target computing component, wherein said source computing component and said target computing component are part of a secure computing environment, method comprising:
    upon said source computing component receiving from said target computing component a signed attestation document, said source computing component verifying an authenticity and content of said attestation document; and
    upon a successful verification of said authenticity and said content, said source computing component transferring said secret to said target computing component, wherein said attestation document is attesting that said target computing component is compliant to an update governance rule.

2. The method according to claim 1, wherein said update governance rule describes that said target computing component is part of a secure execution environment, that said target computing component is compliant to at least one predefined characteristic, and that said target computing component is generated by said a secure computing environment.

3. The method according to claim 2, wherein said predefined characteristic defines a set of earlier source computing components from which an upgrade to said target computing component is possible, and a set of build process characteristics to which said target computing component is compliant with.

4. The method according to claim 1, wherein said target computing component is an updated version of said source computing component.

5. The method according to claim 1, wherein said target computing component and said source computing component is each an executable software container or a virtual machine.

6. The method according to claim 1, wherein said target computing component and said source computing component comprises each an update governance component for ensuring compliance to said update governance rule.

7. The method according to claim 1, also comprising:
    upon a successful verification and said transferring said secret to said target computing component, taking over operation by said target computing component, and shutting down said source computing component.

8. The method according to claim 1, also comprising:
    upon an initialization of a first computing component, creating a new encryption key by said first computing component, and generating a new data store related to said first computing component.

9. The method according to claim 1, wherein an update governance component for ensuring compliance to said update governance rule is located in a third system.

10. The method according to claim 1, wherein said update governance rule describe a list of one or more entities that authorize an update through a secure mechanism.

11. An upgrade system for securely transferring a secret key from a source computing component to a target computing component, wherein said source computing component and said target computing component are part of a secure computing environment, said upgrade system comprising:
    a processor and a memory, communicatively coupled to said processor, wherein said memory stores program code portions that, when executed, enable said processor to:
        upon said source computing component, controlled by said processor, receiving from said target computing component a signed attestation document, said source computing component, controlled by said processor, verifying an authenticity and content of said attestation document; and
        upon a successful verification of said authenticity and said content, said source computing component, controlled by said processor, transferring said secret to said target computing component, wherein said attestation document is attesting that said target computing component is compliant to an update governance rule.

12. The upgrade system according to claim 11, wherein said update governance rule describes that said target computing component is part of a secure execution environment, that said target computing component is compliant to at least one predefined characteristic, and that said target computing component is generated by said a secure computing environment.

13. The upgrade system according to claim 12, wherein said predefined characteristic defines a set of earlier source computing components from which an upgrade to said target computing component is possible, and a set of build process characteristics to which said target computing component is compliant with.

14. The upgrade system according to claim 11, wherein said target computing component is an updated version of said source computing component.

15. The upgrade system according to claim 11, wherein said target computing component and said source computing component is each an executable software container or a virtual machine.

16. The upgrade system according to claim 11, wherein said target computing component and said source computing component comprises each an update governance component for ensuring compliance to said update governance rule.

17. The upgrade system according to claim 11, wherein said processor is also enabled to:
    upon a successful verification and said transferring said secret to said target computing component, taking over operation by said target computing component controlled by said processor, and shutting down said source computing component, controlled by said processor.

18. The upgrade system according to claim 11, also comprising:
    upon an initialization of a first computing component, creating a new encryption key by said first computing component, and generating a new data store related to said first computing component.

19. The upgrade system according to claim 11, wherein said update governance rule describe a list of one or more entities that authorize an update through a secure mechanism.

20. A computer program product for securely transferring a secret key from a source computing component to a target computing component, wherein said source computing component and said target computing component are part of a secure computing environment, said computer program product comprising a computer readable storage medium having program instructions embodied therewith, said program instructions being executable by one or more processors to cause said one or more computing processors to:
    upon said source computing component, controlled by said processor, receiving from said target computing component a signed attestation document, said source computing component, controlled by said processor, verifying an authenticity and content of said attestation document; and upon a successful verification of said authenticity and said content, said source computing component, controlled by said processor, transfers said secret to said target computing component, wherein said attestation document is attesting that said target computing component is compliant to an update governance rule.

\* \* \* \* \*